(12) United States Patent
Hehr

(10) Patent No.: US 6,401,999 B1
(45) Date of Patent: Jun. 11, 2002

(54) HITCH MOUNTED CARRIER ASSEMBLY

(76) Inventor: Kenneth L. Hehr, 5514 Neilson Ave., Ferndale, WA (US) 98248

( * ) Notice: Subject to any disclaimer, the term of this patent is extended or adjusted under 35 U.S.C. 154(b) by 39 days.

(21) Appl. No.: 09/657,766

(22) Filed: Sep. 8, 2000

Related U.S. Application Data

(60) Provisional application No. 60/153,118, filed on Sep. 8, 1999.

(51) Int. Cl.$^7$ .................................................. B60R 9/00
(52) U.S. Cl. ........................ 224/502; 224/504; 224/505; 224/508; 224/509
(58) Field of Search ................................ 224/509, 502, 224/504, 505, 508, 518, 519, 531, 532; 414/462

(56) References Cited

U.S. PATENT DOCUMENTS

| | | |
|---|---|---|
| 5,181,822 A | 1/1993 | Allsop et al. |
| 5,685,686 A * | 11/1997 | Burns .......................... 414/462 |
| 5,730,345 A * | 3/1998 | Yeckley et al. ............. 224/505 |

* cited by examiner

Primary Examiner—Gregory M. Vidovich
Assistant Examiner—Maerena W. Brevard
(74) Attorney, Agent, or Firm—Todd N. Hathaway

(57) ABSTRACT

A pivotable carrier assembly for mounting to a vehicle trailer hitch. The carrier assemble includes a lower support which is mounted to the hitch, and a pivotable upright support having a rack head rotatably mounted to the upper end thereof. A linkage rotates the head in response to the upright support being pivoted away from the vehicle, so as to maintain the load in an upright orientation. The linkage includes upper and lower crank links which are connected by an elongate actuating rod. The rack may be configured to carry any suitable cargo, including bicycles or skis, for example.

8 Claims, 7 Drawing Sheets

HITCH MOUNTED CARRIER ASSEMBLY

This application claims benefit of Provisional No. 60/153,118 filed Sep. 8, 1999.

BACKGROUND a. Field of the Invention

The present invention relates generally to the exterior racks and carriers for motor vehicles, and, more particularly to a hitch-mounted carrier assembly which swings downwardly to provide clearance for lift gate or loading/unloading while at the same time maintaining the load which is supported thereby in an upright orientation.

b. Related Art

Many vehicles, especially pick-up trucks, vans and sport utility vehicles, are fitted with receiver hitch assemblies for towing trailers. When not being used for towing, however, the receiver socket (typically, a 2-inch by 2-inch square tube) provides a strong and convenient attachment fitting for mounting a variety of accessories and carriers at the rear of the vehicle.

For example, the receiver socket is often used to support a bicycle rack, so as to avoid the need to carry the bicycles inside or on top of the vehicle. When mounted to a van, station wagon or sport utility vehicle, however, the height of the bicycles may cause this to interfere with the operation of the vehicle's lift gate; in other words, with the bottom of the bicycle supported at bumper level and with the bicycle positioned reasonably close behind the vehicle, the handlebars and seat will ordinarily be in the way of the lift gate opening and closing.

Another problem associated with many hitch-mounted racks is the need for the operator to lift the bicycle or other load a considerable distance in order to place it on the rack. However, the bicycle must be supported in an elevated position during transport, or else its wheels will protrude below the bumper and be exposed to damage.

Some prior attempts have been made at solving these problems using a "swing away" mechanism. In these devices, the top of the rack pivots outwardly from the vehicle in order to provide the necessary clearance for the lift gate. However, a serious problem arises when the load does not maintain its upright orientation as the rack pivots outwardly. This causes the bicycles or other load to twist in the rack and may result in damage, especially if several bikes are being carried together. Furthermore, tilting of the rack makes it very difficult or impossible to load the bicycles onto the carrier when it is in its lowered position, so that in most instances the user can only load/unload the carrier when it is in its upright, stowed configuration.

The device shown in U.S. Pat. No. 5,181,822 (Allsop et al.) represents an attempt to alleviate these problems by keeping the upper support of the rack level as the rack is pivoted away from the rear of the vehicle. However, this device relics on a cumbersome arrangement of parallel, spaced-apart supports. As a result, the assembly not only requires excessive material and labor to manufacture, but it is also untidy in appearance and difficult to clean. Moreover, the spaced-apart supports occupy a significant amount of space at the rear of the vehicle, which could otherwise be used to carry additional bicycles or other cargo.

Accordingly, there exists a need for a hitch-mounted carrier for bicycles or other cargo which pivots outwardly and downwardly from the vehicle for loading/unloading and to provide clearance for the vehicle lift gate, while at the same time maintaining the cargo in an upright orientation. Furthermore, there exists a need for such a carrier which is positive and effective in its action, and which has a neat and easy to clean exterior configuration. Still further, there exists a need for such a carrier in which the mechanism occupies a minimum of space at the rear of the vehicle, to as to maximize the room which is available for carrying cargo. Still further, there exists a need for such an apparatus which safe to operate, and which is durable and long wearing in use.

SUMMARY OF THE INVENTION

The present invention has solved the problems cited above, and is a pivotable carrier assembly in which the rack holds the cargo upright as the assembly pivots outwardly to provide clearance for a vehicle lift gate or for loading/unloading the carrier.

Broadly, the carrier assembly comprises a lower support for mounting to a vehicle hitch, an upright support having a lower end which is pivotably mounted to the lower support, a rack head which is pivotably mounted to an upper end of the upright support, and a linkage for rotating the head on the upright support in response to the upright support being pivoted from a stowed position to a deployed position, so as to maintain a predetermined angular relationship between the rack head and the lower support of the assembly, The linkage may comprise upper and lower crank links, the upper link being fixedly mounted to the rack member and rotatably mounted to the upright support and the lower link being fixedly mounted to the lower support and rotatably mounted to the upright support, and a connector member which is mounted to the two outer ends of the upper and lower crank links, so that in response to the upright support being pivoted relative to the lower support, the linkage cooperates so as to rotate the rack head on the upright support so as to maintain the predetermined angular relationship between the rack head and the lower support of the assembly.

The upper and lower crank links may be of approximate equal length and may extend generally parallel to one another. The connector member mounted to the ends of the links may be substantially rigid bar.

The rack head may comprise a generally horizontal rack portion extending rearwardly from head for supporting an article of cargo thereon. For example, the rack portion may be configured to support a plurality of bicycles or skis thereon.

The lower support of the assembly may comprise a Generally horizontal tongue or bar for insertion into a standard receiver hitch.

These and other features and advantages of the present invention will be apparent from a reading of the following detailed description with reference to the associated drawings.

DETAILED DESCRIPTION a. Overview

Figure 1:
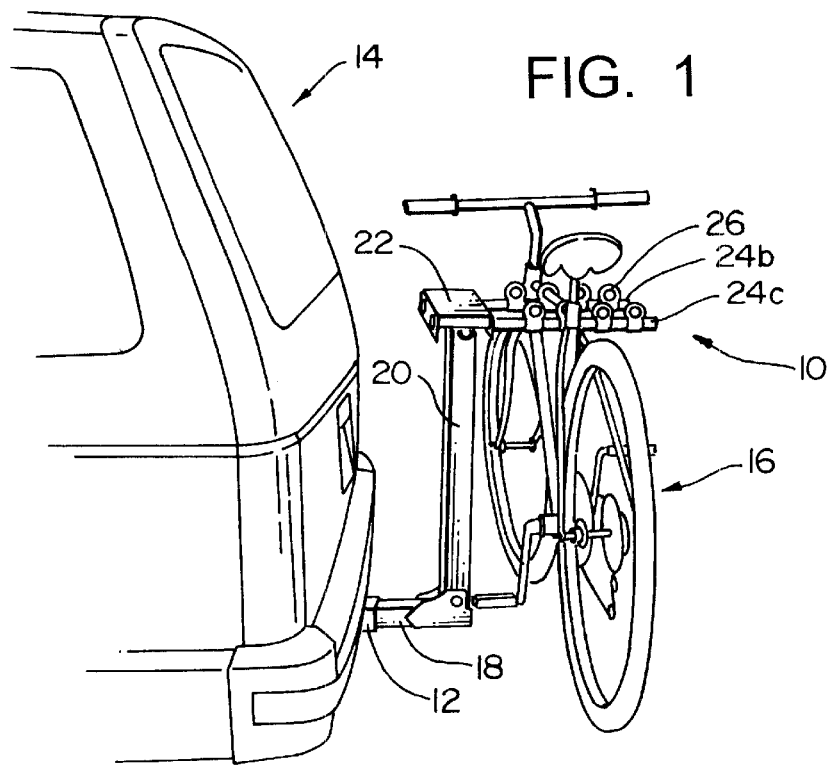
FIG. 1 is a perspective, environmental view of a hitch mounted carrier assembly in accordance with the present invention, showing this mounted at the rear of a sport utility vehicle and carrying a bicycle thereof.

FIG. 1 shows a carrier assembly 10 in accordance with a representative embodiment of the present invention, mounted to a hitch 12 at the rear of an exemplary sport utility vehicle 14. The carrier assembly in FIG. 1 is shown carrying a bicycle 16, and for purposes of illustration the following description will refer primarily to this embodiment; it will be understood, however, the carrier assembly of the present invention may be configured for use with any cargo which is to be carried at the rear of a vehicle and which is to be maintained in an upright orientation, such as skis, surfboards, motorcycles, ATV's, gas cans, luggage, and waste barrels and other containers for solids and liquids, to give just a few examples. Furthermore, while the invention is shown herein being used with a standard receiver-type hitch, it will be understood that various embodiments of the invention may be configured for attachment to other types of hitches, or for direct mounting to the vehicle itself.

As will be described in greater detail below, the main external members of the carrier assembly are a stationary, generally horizontal hitch insert 18, a pivoting, generally upright support tube 20, and a pivoting rack head 22 which rotates atop tube 20 so as to always remain parallel to the hitch insert 18, i.e., so as to always remain in a horizontal orientation. A pair of horizontal arms 24a, 24b extend rearwardly from the rack head 22, and are provided with elastomeric mounts 26 for supporting the top tubes of a plurality of bicycles in a spaced, generally parallel relationship thereon. In the example which is shown FIGS. 1–4, the tubular support arms are mounted to the rack head by welds 27, which are formed on the inside of the upper channel of the head so as to provide a more finished appearance.

FIG. 1 shows the carrier assembly in the forward, stowed position, where the assembly will normally remain during transportation. To provide clearance for opening the vehicle lift gate 30, the latch mechanism (which will be described below) is released and the carrier assembly is pivoted to the rearward, deployed configuration shown in FIG. 2, in which the Support tube 20 extends at an angle of about +45° (0° being vertical) so as to allow the edge of the lift gate to pass through arc 32. As this is done, the internal linkage causes the rack head 22 to rotate atop the support tube, thereby maintaining the rack arms 24a, 24b in a horizontal orientation. The cargo which is supported thereby (in this case, the bicycle 16) is thus maintained in its original, upright orientation throughout the range of travel.

Figure 2:
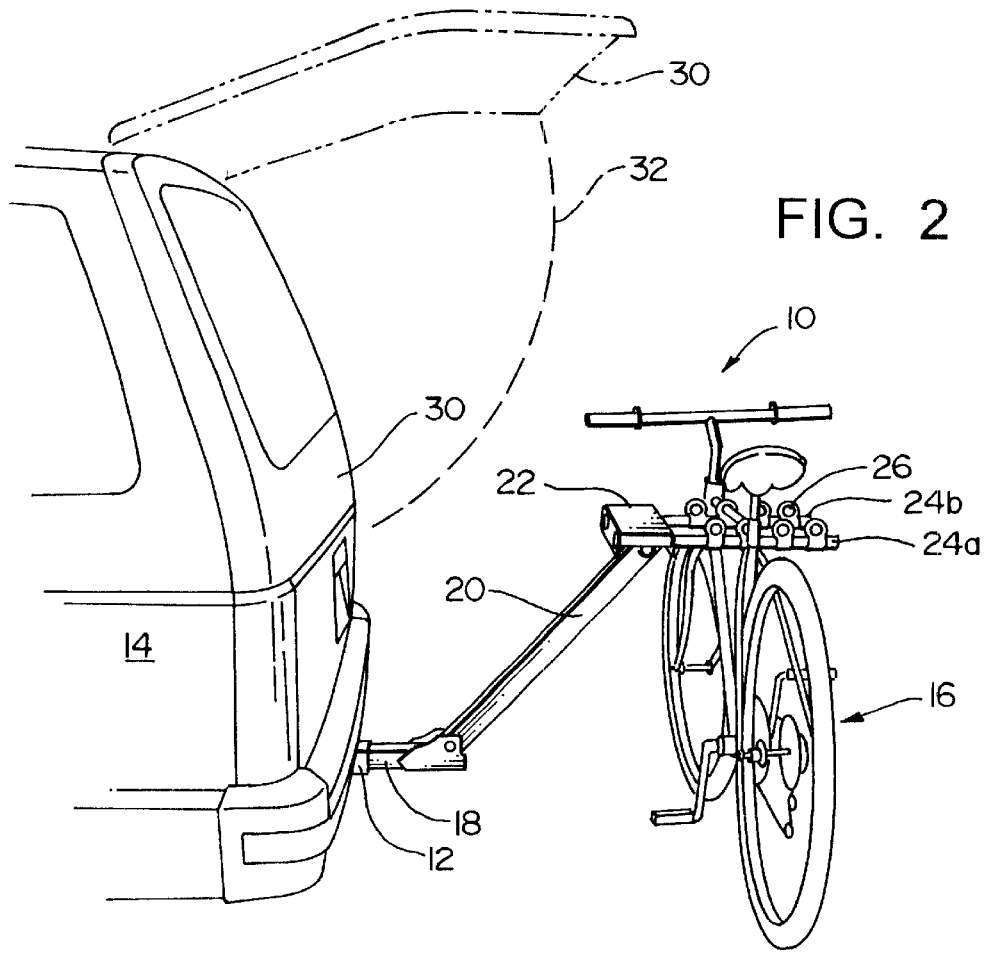
FIG. 2 is a perspective, environmental view, similar to FIG. 1, showing the carrier assembly having been pivoted outwardly so as to provide clearance for operation of the vehicle lift gate.

The invention thus eliminates the problems with the prior art devices noted above and facilitates the ease of loading/unloading the cargo. Also, as can be seen in FIGS. 1–2, the assembly employs a single upright support member (i.e., support tube 20), thereby providing a much neater and more compact apparatus than prior devices and leaving more room for bicycles or other cargo to be carried at the rear of the vehicle.

b. Pivot Mechanism

Figure 3:
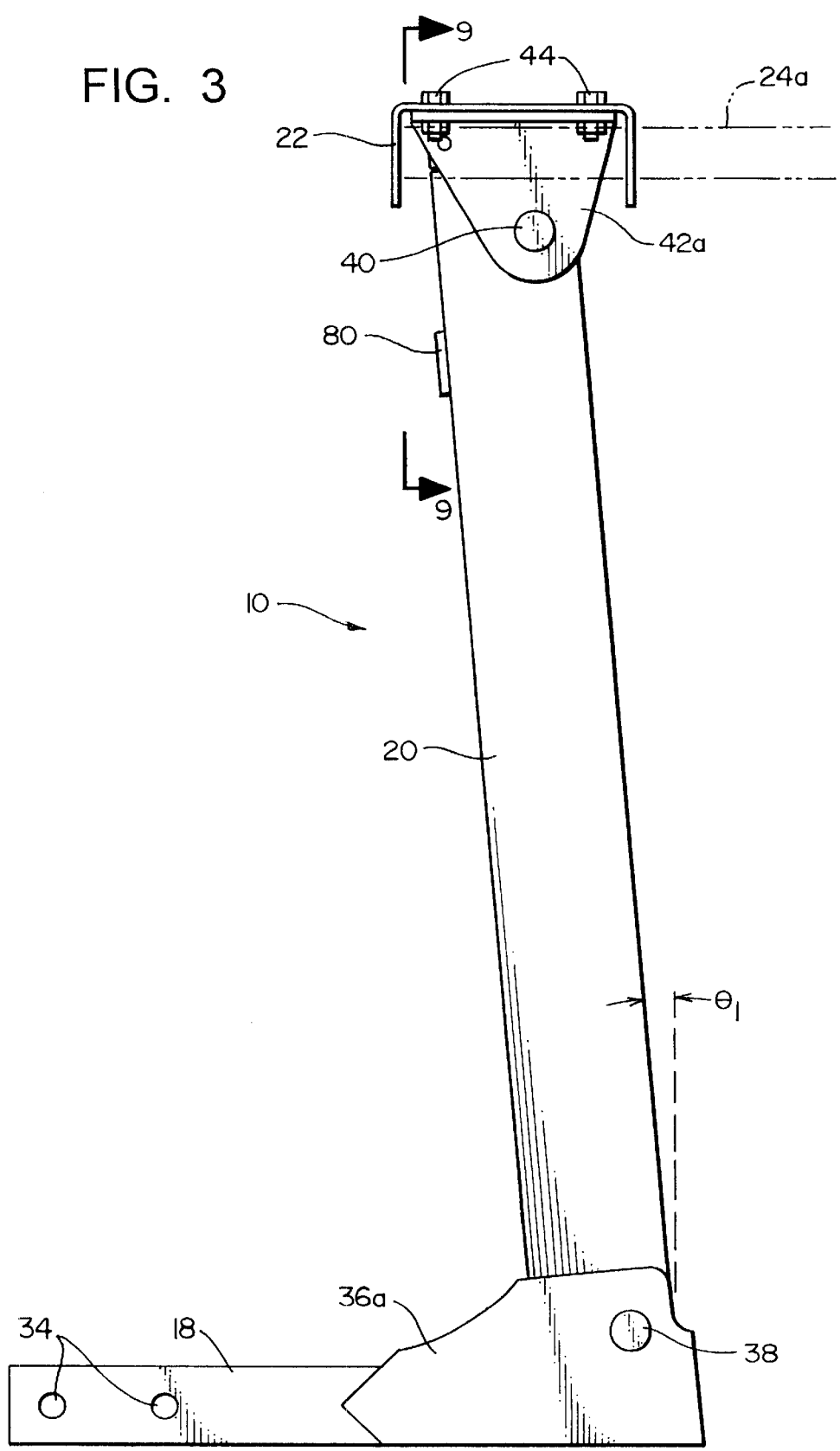
FIG. 3 is an elevational view of the carrier assembly of FIGS. 1–2, showing the configuration of the assembly in the forwardly pivoted, stowed position.

FIG. 3 shows the principal external components of the carrier assembly 10 in greater detail.

As can be seen, the forward end of the lower support member 18 is configured as a bar or tongue which is suitable to be installed in the socket of a conventional receiver hitch (i.e., in most applications this will be a 2 inch ×2 inch square bar or tube), and is provided with one or more transverse bores 34 for passage of a hitch pin therethrough.

A pair is spaced, generally parallel side plates 36a, 36b (only 36a being visible in FIG. 3) are welded or otherwise mounted at the rearward end of the bar member, and support a pivot pin 38 which extends through the lower end of vertically extending tube 20. The pivot pin 38 is welded or otherwise fixedly mounted to the side plates 36a, 36b, i.e., it is unable to rotate relative to the hitch insert 18; however, it is free to rotate within the vertical support tube 20, as will be described in greater detail below.

Similarly an upper pivot pin 40 extends through the upper end of vertical support tube 20 in pivotably relationship therewith, with parallel upper side plates 42a, 42b (only 42a being visible in FIG. 3) being fixedly mounted to the ends of the pin 40. The upper side plates 42a, 42b, in turn, are attached by bolts 44 or otherwise fixedly mounted to the top plate of the rack head 22.

Figure 7:
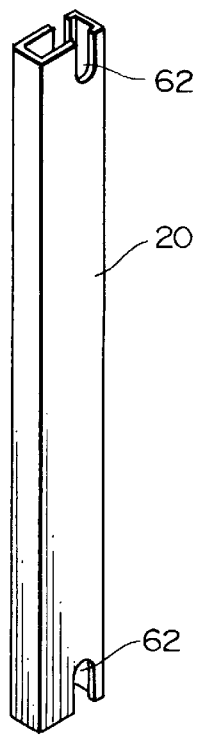
FIG. 7 is a perspective view of the tubular upright support of the carrier assembly of FIGS. 1–6.

The pivot pins 38, 40 are preferably supported for rotation in the support tube by suitable bearings, e.g., bushings or washers which are mounted to the exterior of the tube. For example, as can be seen in FIG. 7, tube 20 (which is suitably constructed of rectangular cross-section material, such as tubular steel, aluminum or fiberglass for example) is provided with U-shaped cutouts 62 at its upper and lower ends to accommodate the pivot pins, and washers 64 (see FIG. 8) or other suitable bushings or bearings are welded or otherwise mounted to the tube as to support the pivot pins in the ends of the cutouts. As can be seen, the washers are mounted on the outside of the tube 20 so as to also provide outer bearing surfaces which stabilize and engage the upper and lower side plates 42a, 42b and 34a, 34b; in the embodiment which is shown in FIG. 8, the washers 64 are provided with comparatively small diameter outer shoulders 66 which form a neat and comparatively narrow "paint break" where these meet the side plates, thereby maintaining a neat appearance and minimizing corrosion.

On the inside of the support tube, upper and lower crank links 46, 48 are fixedly mounted to the upper and lower pivot pins 40, 38. The arms of the crank links extend generally parallel to one another, forwardly of the rotational axes of the pivot pins, and are joined at their ends by an actuating rod 50 which is mounted to upper and lower crank pins 52, 54.

Figure 5:
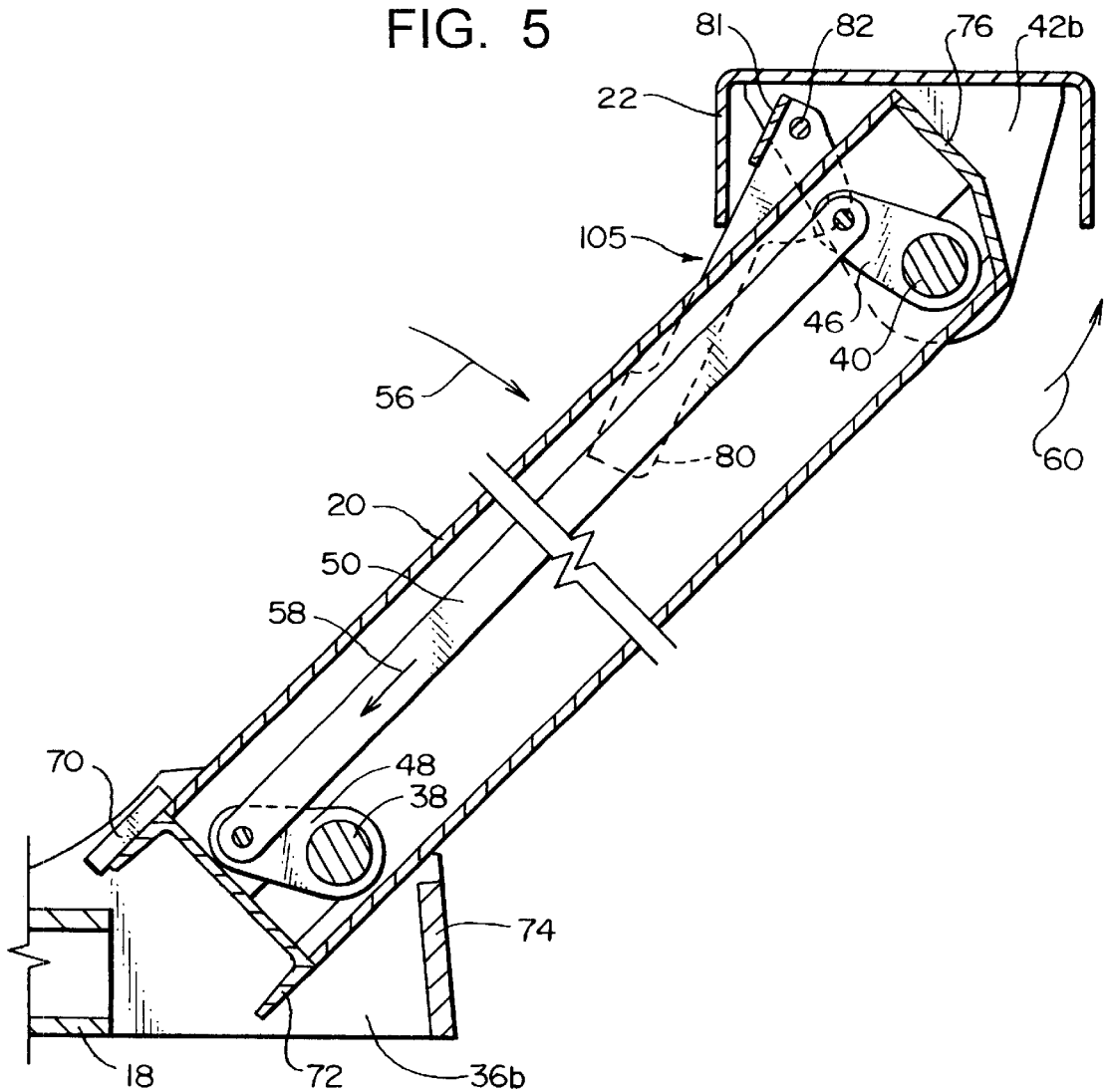
FIG. 5 is a cross-sectional view, similar to FIG. 4, showing the orientation of the internal components of the carrier assembly when the assembly is in its rearwardly pivoted, deployed configuration.

Thus, when the assembly is moved outwardly towards its deployed position, the upright support tube 20 pivots outwardly and downwardly on lower pivot pin 38, in the direction indicated by arrow 56 in FIG. 5. As this is done, the lower crank link 48 remains stationary relative to the hitch insert 18 (being fixedly mounted to side plates 34a, 34b), thereby applying a downward (i.e., tension) force on rod 50, as indicated by arrow 58. Since the actuating rod is of fixed length, this rotates the upper link 46 downwardly within the upper end of the vertical support tube, thereby rotating the rearward side of the top bracket upwardly (relative to support tube 20) in the direction indicated by arrow 60. When the assembly is returned to the stowed position, the components rotate in the opposite direction, with the tension being maintained on actuating rod 50 by the weight of the bicycles or other cargo. Thus, since the two crank links 48, 60 always remain parallel to one another, the rack head always remains parallel to the hitch insert 18, and therefore always maintains the cargo in an upright orientation as the assembly moves between its stowed and deployed positions.

Figure 8:
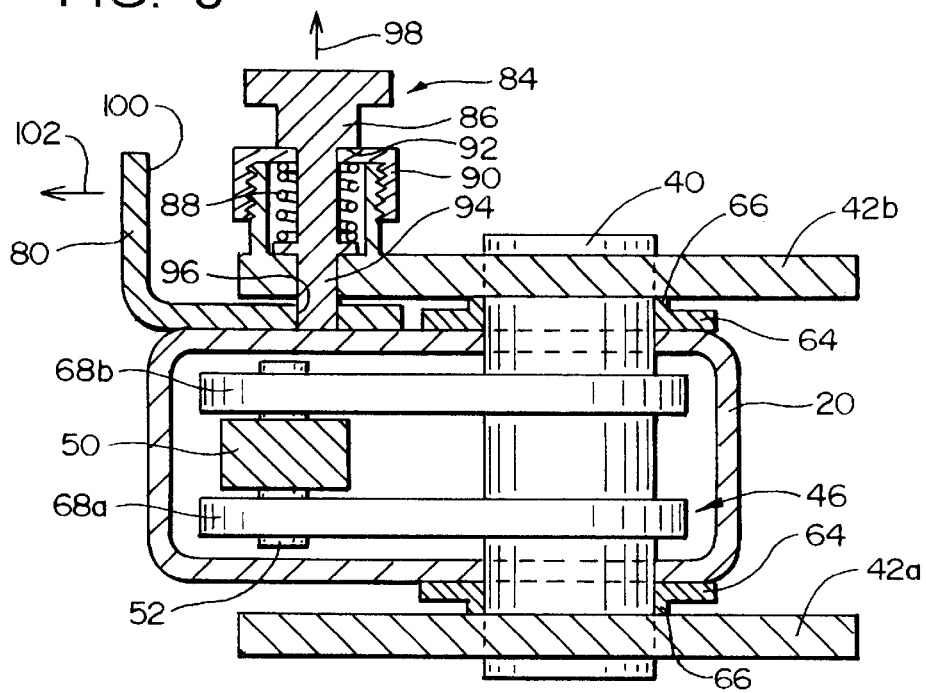
FIG. 8 is a cross-sectional view, taken along line 8—8 in FIG. 4, showing the operation of the spring loaded plunger which selectively retains the latch mechanism in the locked configuration.

As can be seen in FIG. 8, each of the upper and lower crank links 46, 48 is preferably made up of a pair of parallel arms or plates 68a, 68b which flank and fit tightly against the sides of the actuating rod 50. This arrangement eliminates development of twisting loads between links and actuating rod, thereby reducing wear and providing a more positive action. In the embodiment which is illustrated, the actuating rod 50 is formed of a solid bar of metal or other material. It will be understood, however, that other members capable of transmitting tension loads between the upper and lower links may be employed, including a chain, a cable, or other forms of flexible or rigid members.

As was noted above, the vertical support arm 20 extends rearwardly at a predetermined angle when in the deployed position, with an angle of about +45° being suitable for many applications. The support tube 20 is arrested at this angle by a stop plate 70 which is welded between the side plates 34a, 34b. For enhanced strength and durability, a channel piece 72 or other suitable bracket is preferably welded to the bottom of the tube 20 for engaging the stop plate in face-to-face abutment at the desired angle.

Figure 4:
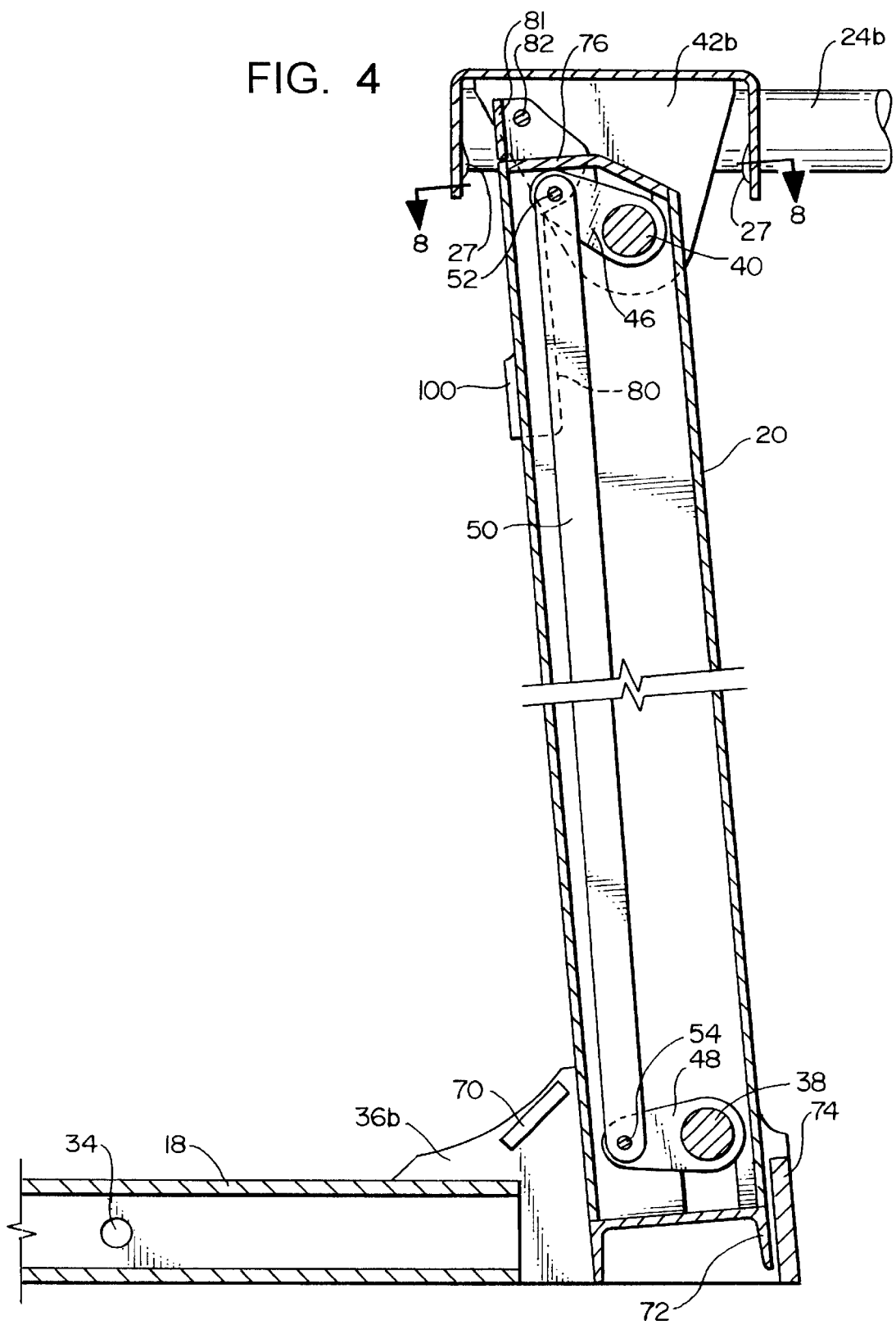
FIG. 4 is a cross-sectional view of the carrier assembly of FIG. 3, showing the orientation of the internal components when the assembly is the stowed position.

When the assembly is in the stowed position, in turn, motion of the support tube 20 is arrested by the opposite face of the channel piece 72 or other bracket coming into abutment with a second stop plate 74 which is mounted across the back of the side plates 34a, 34b (see FIG. 4). Simultaneously, the upper crank link 46 rotates upwardly into abutment with a cap plate 76 which is mounted across the top of the support tube 20, so as to also arrest motion of the assembly at the desired position. The stop plates 74, 76 thus cooperate to arrest the assembly in a very positive manner, thereby eliminating any possibility of the assembly accidentally striking the rear of the vehicle.

When in the stowed position, the vertical Support tube 20 preferably extends at a slight forward angle $\tilde{O}_1$ (see FIG. 3). The forward angle is preferably in the range from about −5° to about −10° (0° degrees being vertical), with an angle of about −8° being suitable for many applications. This provides more compact stowage of the cargo, and also creates an "over-center" effect; in other words, with the vertical support angled in the forward direction, the weight of the assembly and cargo acts to force the support in the forward direction, i.e., towards the vehicle. Pivoting the assembly to the deployed position consequently requires exertion of a small degree of physical force on the part of the operator, in order to lift and move support 22 past vertical. This helps to prevent accidental deployment of the assembly, in the event that the latch mechanism breaks or fails to engage completely, and also gives the assembly a more positive "feel" as it is pivoted into the stowed position.

It will be understood that while a tubular upright support member such as that which has been described herein has the advantage of housing the linkage so as to present a neat appearance and protect the linkage from the environment, and also supports both ends of the upper and lower pivots members so as to avoid development of unbalanced twisting forces, in other embodiments the vertical support member may not be tubular or may not enclose the components, e.g., the support may be formed as a bar, beam, channel or other elongate member to which the pivots and associated linkage are internally or externally mounted.

c. Latch Mechanism

Figure 6:
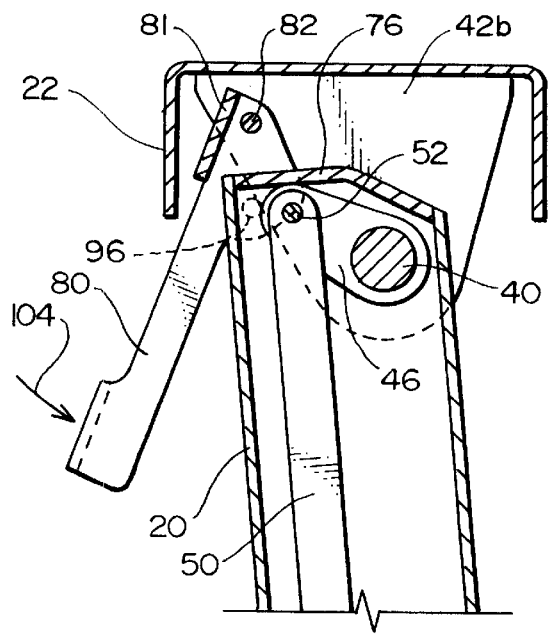
FIG. 6 is a cross-sectional view of the upper portion of the carrier assembly of FIGS. 1–5, showing the latch mechanism which locks the assembly in its stowed configuration.
Figure 9:
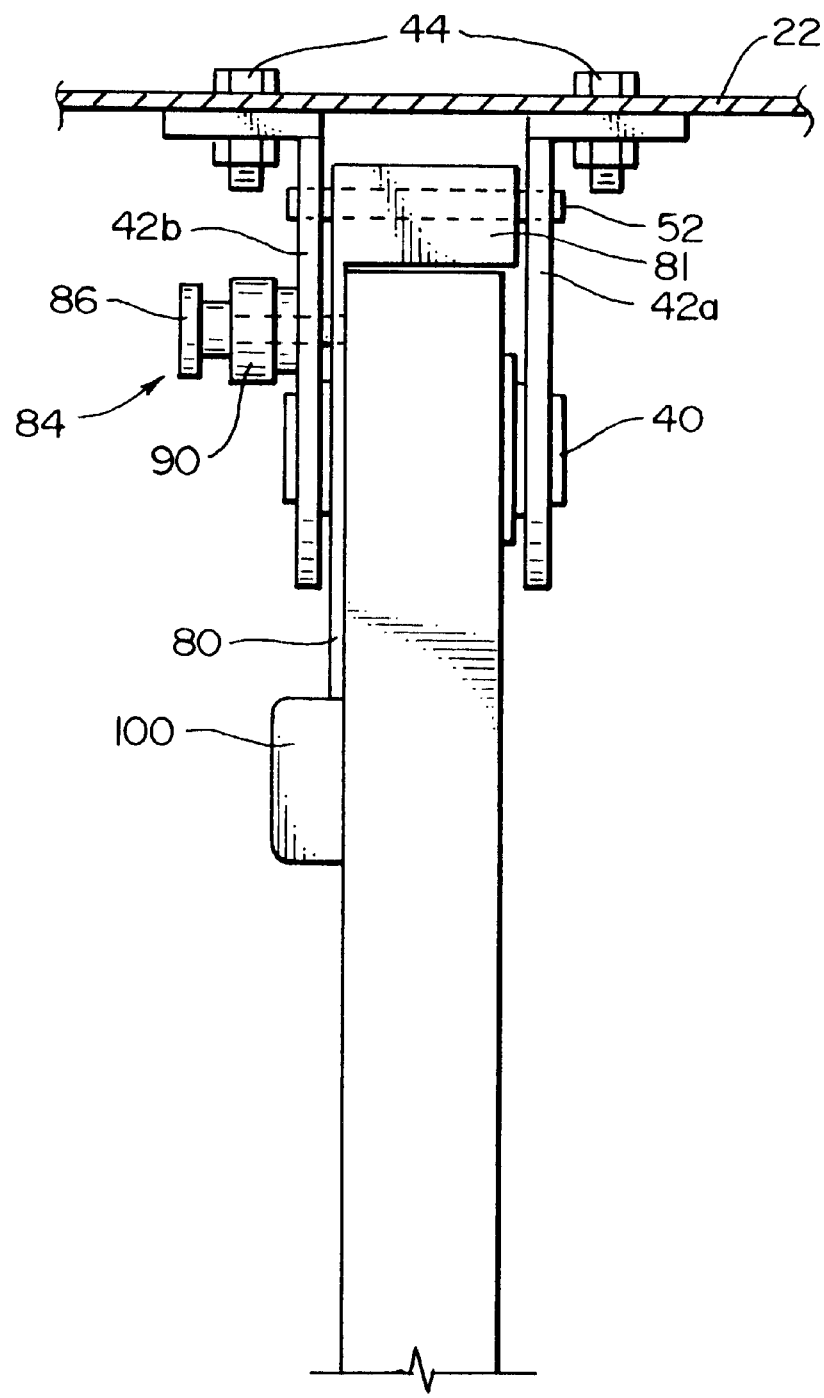
FIG. 9 is an elevational view of the upper portion of the carrier assembly of FIGS. 1–6, showing the spring-loaded plunger and handle of the latch mechanism in greater detail.

The latch mechanism for locking the carrier assembly in the stowed position is more clearly shown in FIGS. 6 and 8–9.

As can be seen, the latch mechanism includes a pivotable latch arm 80 having a stop plate 81 mounted at its upper end. The latch arm is mounted to one of the upper side plates 42b by a pivot pin 82, so that the upper end of the latch arm rotates together with the rack head 22 relative to support tube 20. With assembly stowed and the latch arm in the locked position, as is shown in FIG. 4, the stop plate 81 is positioned in vertical abutment with the forward edge of support arm 20. This prevents the forward edge of the arm from rotating upwardly (clockwise in FIG. 4) relative to the rack head 22, thereby locking the assembly in the stowed position.

A lock mechanism 84 is provided for selectively retaining the latch arm in the locked position. As can be seen in FIG. 8, the lock mechanism includes a spring-loaded plunger which is biased towards pivot tube 20 by a coil spring 88 which reacts against housing 90 and a shoulder 92 on plunger shaft 94. The plunger shaft extends through a bore in side plate 42b and the latch arm 80 is provided with a corresponding bore 96 which moves into register with the plunger shaft when the latch arm is in the locked position. Thus, when the latch arm is in the locked position the plunger shaft is urged into bore 96 by spring 88 so as to lock the arm in place.

In order to unlock the assembly, the operator pulls the spring loaded plunger outwardly, in the direction indicated by arrow 98 in FIG. 8, so as to withdraw shaft 94 from the bore in the latch arm. The operator then pulls the latch arm forwardly using handle extension 100, in the direction indicated by arrow 102 in FIG. 8. As this is done, the stop plate 81 on the upper end of the latch arm moves clear of the forward edge of the support tube 20, thereby allowing the support tube to pivot relative to rack head 22. The assembly can then be pivoted outwardly and downwardly to the deployed configuration, as shown in FIG. 5.

After the carrier assembly has been pivoted back to its stowed position, the operator presses the lower end of the latch arm 80 downwardly and inwardly towards the front of the support tube, in the direction indicated by arrow 104 in FIG. 6. This moves the bore 96 in the latch arm back into register with the shaft of the spring-loaded plunger so that the shaft 94 snaps back into the bore and locks the latch arm in place. The assembly is thus secured in the stowed position until the operator again unlocks it by withdrawing plunger 86.

The preferred latch mechanism which is shown in the figures has several advantages in terms of strength, durability and convenience of use. It will be understood, however, that other forms of latching or locking mechanisms may be used with the basic pivot mechanism of the invention. By way of example, other forms of latching or locking mechanisms may include various forms of bolts, pins, plates and so on which lock the vertical support member to the hitch insert or to the rack head so as to prevent rotational motion between the two. For example, the assembly can be locked in the stowed position by a bolt or pin which passes into the lower portion of the support tube 20 through lower side plates 34a, 34b, or through the rearward stop member 74.

d. Rack Head Configurations

As was noted above, the rack head and its attachments can be configured for carrying any appropriate type of cargo, not just the bicycles shown in FIGS. 1–2.

Figure 10:
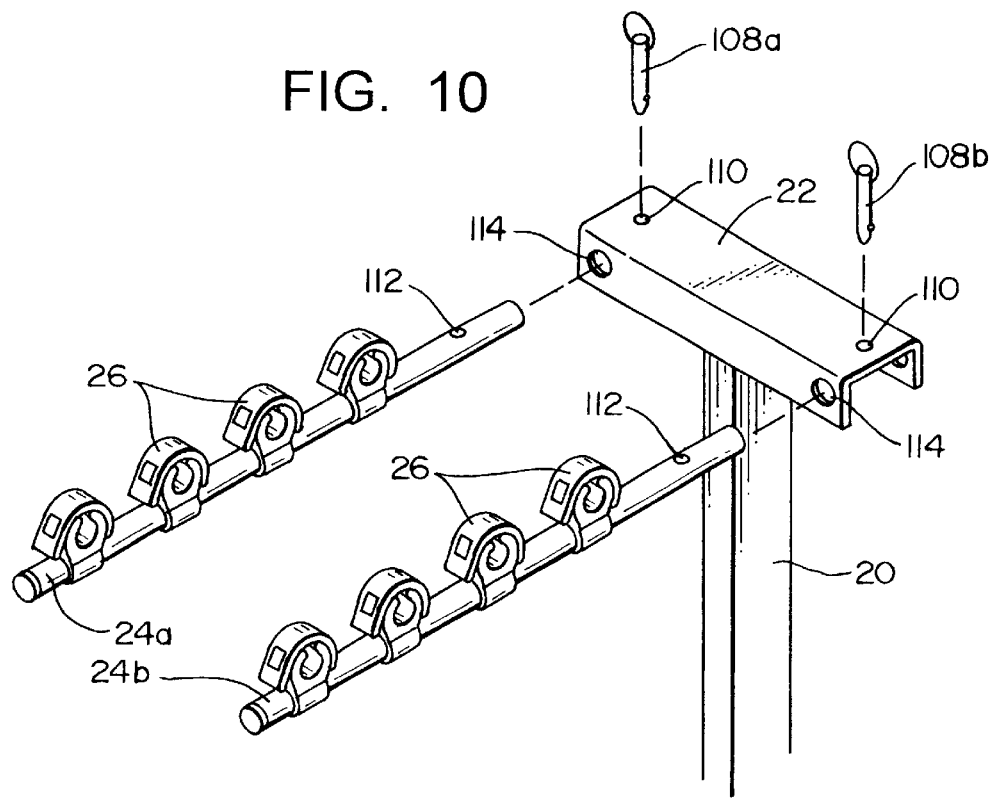
FIG. 10 is a perspective view of the upper end of a carrier assembly in accordance with an embodiment in which the support tubes for carrying the bicycles are detachably mounted to the head of the carrier assembly.

For example, FIG. 10 shows a somewhat different structure for mounting the bicycle support arms 24a, 24b to the rack head 22, using first and second detent pins 108a, 108b which pass through corresponding bores 110, 112 in the ends of the support arms when these are inserted in openings 114 in the rack head. This arrangement has the advantage of allowing individual removal and replacement of the support arms, for example, to replace bent or damaged arms. Other mounting fixtures can be interchangeably attached to the pivot head in the same or similar manner.

Figure 11:
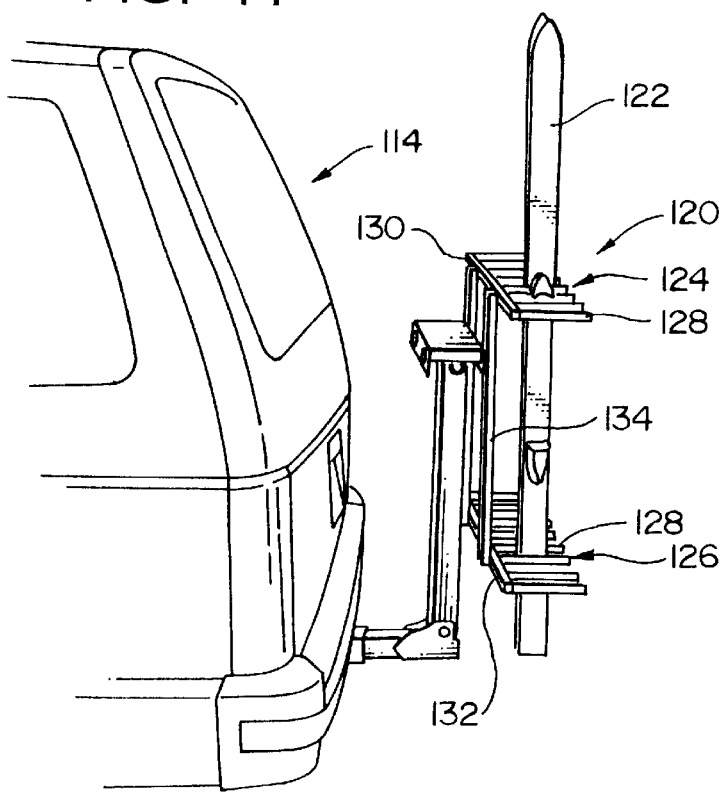
FIG. 11 is a perspective, environmental view, similar to FIG. 1, showing a carrier assembly in accordance with an embodiment of the present invention in which the assembly is configured to carry a plurality of skis at the rear of a vehicle.

FIG. 11, in turn, shows a rack assembly 120 which is substantially identical to that described above, except that the rack head is configured to carry a plurality of skis 122 instead of bicycles. In this embodiment, the rack includes upper and lower rows 124, 126 of spaced, horizontally extending bars 128 which are arranged in pairs to define receiving areas for each pair of skis, and which are mounted on horizontal header pieces 130, 132 which are supported from rack head 22 by vertical bars 134.

Accordingly, it will be understood that the embodiments described herein show just a few examples of the many types of supports and attachments which can be mounted to the pivoting rack head of the present invention so as to support the intended the load in an upright orientation.

It is to be recognized that various alterations, modifications, and/or additions may be introduced into the constructions and arrangements of parts described above without departing from the spirit or ambit of the present invention.

What is claimed is:

1. A carrier assembly, comprising:

a lower support member for mounting to a vehicle hitch;

an upright support member having a lower end which is pivotably mounted to said lower support member;

a head member which is pivotably mounted to an upper end of said upright support member; and a linkage, inside said support member, for rotating said head member on said upright support member in response to said upright support member being pivoted from a stowed position to a deployed position, so as to maintain a predetermined angular relationship between said head member and said lower support member, said linkage comprising;

upper and lower crank links, said upper crank link being fixedly mounted to said head member and rotatably mounted to said upright support member, and said lower crank link being fixedly mounted to said lower support member and rotatably mounted to said upright support member; and a connector member mounted to outer ends of said upper and lower crank links;

so that in response to said upright support member being pivoted relative to said lower support member, said linkage cooperates so as to rotate said head member on said upright member so as to maintain said predetermined angular relationship between said head member and said lower support member.

2. The carrier assembly of claim 1, wherein said upper and lower crank links are of approximately equal length and extend generally parallel to one another.

3. The carrier assembly of claim 1, wherein said connector member is a substantially rigid bar.

4. The carrier assembly of claim 1, wherein said lower support member comprises a generally horizontal bar member for insertion into a receiver hitch.

5. The carrier assembly of claim 1, wherein said head member is configured to hold an article of cargo in an upright position when said head member is in said predetermined angular relationship to said lower support member.

6. The carrier assembly of claim 5, wherein said lower support member comprises a generally horizontal bar member for mounting to said hitch, and said head member comprises a generally horizontal rack portion extending rearwardly from said head member for supporting an article of cargo thereon.

7. The carrier assembly of claim 6, wherein said rack portion is configured to support a plurality of bicycles thereon.

8. The carrier assembly of claim 7, wherein said rack portion is configured to support a plurality of skis thereon.

* * * * *